US012472469B2

(12) United States Patent
Buddhiraju et al.

(10) Patent No.: US 12,472,469 B2
(45) Date of Patent: Nov. 18, 2025

(54) METHOD AND SYSTEM TO MONITOR AND CONTROL CONTINUOUS ULTRAFILTRATION PROCESS UNITS

(71) Applicant: Tata Consultancy Services Limited, Mumbai (IN)

(72) Inventors: Venkata Sudheendra Buddhiraju, Pune (IN); Venkataramana Runkana, Pune (IN); Vishnu Swaroopji Masampally, Pune (IN); Karundev Premraj, Pune (IN); Vivek Kumar, Pune (IN); Swati Sahu, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 486 days.

(21) Appl. No.: 18/049,338

(22) Filed: Oct. 25, 2022

(65) Prior Publication Data

US 2023/0139290 A1 May 4, 2023

(30) Foreign Application Priority Data

Nov. 2, 2021 (IN) ............................ 202121050333

(51) Int. Cl.
*B01D 61/22* (2006.01)
*B01D 61/14* (2006.01)

(52) U.S. Cl.
CPC ........... *B01D 61/22* (2013.01); *B01D 61/145* (2013.01); *B01D 2313/701* (2022.08)

(58) Field of Classification Search
CPC .................. B01D 61/22; B01D 61/145; B01D 2313/701; B01D 2311/24; B01D 2313/70;
(Continued)

(56) References Cited

U.S. PATENT DOCUMENTS

2020/0368755 A1* 11/2020 Gräber .................... B02C 25/00
2021/0171362 A1* 6/2021 Cunningham ....... B01D 61/146
(Continued)

FOREIGN PATENT DOCUMENTS

WO WO-2020219626 A1 * 10/2020 ............. B01D 61/12
WO WO-2021205479 A2 * 10/2021 ......... G05B 13/0265
WO WO-2022219443 A1 * 10/2022 ............. G01N 25/56

OTHER PUBLICATIONS

Quezada C, Estay H, Cassano A, Troncoso E, Ruby-Figueroa R. Prediction of Permeate Flux in Ultrafiltration Processes: A Review of Modeling Approaches. Membranes (Basel). May 18, 2021;11(5):368 (Year: 2021).*

(Continued)

*Primary Examiner* — Catherine T. Rastovski
(74) *Attorney, Agent, or Firm* — Finnegan, Henderson, Farabow, Garrett & Dunner, LLP

(57) ABSTRACT

This disclosure relates generally to method and system to monitor and control continuous ultrafiltration (UF) process units. In real time, continuous operation of UF to handle variating concentration in feed stream is tedious and complex. The UF plant system receives a plurality of input data configured to UF process units and from the real time data outliers are removed and missing values are imputed. The prediction module predicts a volumetric concentration factor (VCF) value and a throughput value by selecting a model from a model repository. The optimization module optimizes the VCF value, and the throughput value based on a plurality of optimal variables recommended for a given feed concentration. The UF plant system controls the VCF value and the throughput value for a predefined period of a prediction horizon based on a plurality of trajectory profiles recommended for the feed flow rate, the pressure data, and a feed concentration.

18 Claims, 9 Drawing Sheets

UF plant
Real-time data
UF plant system
Real-time data
Feed
Wastes
SPTFF System
Product
Recommendations
Real-time and non-real-time data
Server 240
Real-time data
Recommendations
User Interface 242
UF Plant Controller
Knowledge
Data Receiving Module 210
Data Preprocessing Module 212
CDC Module 214
Fault Detection Module 216
Plurality of CDC models 232
Control Module 222
Optimization Module 220
Prediction Module 218
Model Repository 230
Self-Optimization module 224
Offline Simulation Module 226
Self-learning Module 228

(58) Field of Classification Search
CPC .... B01D 65/02; B01D 61/146; B01D 61/149; B01D 65/109; B01D 65/08
See application file for complete search history.

(56) References Cited

U.S. PATENT DOCUMENTS

| | | | | |
|---|---|---|---|---|
| 2022/0236700 | A1* | 7/2022 | Chen | C02F 1/008 |
| 2022/0275475 | A1* | 9/2022 | Singh | C22B 1/243 |
| 2022/0283561 | A1* | 9/2022 | Buddhiraju | G05B 13/042 |
| 2023/0398498 | A1* | 12/2023 | Faramarzi | B01D 65/02 |

OTHER PUBLICATIONS

R. Abohtyra, Y. Chait, M. J. Germain, C. V. Hollot and J. Horowitz, "Individualization of Ultrafiltration in Hemodialysis," in IEEE Transactions on Biomedical Engineering, vol. 66, No. 8, pp. 2174-2181, Aug. 2019 (Year: 2019).*

Sofia Ramos Cabral, "Optimization of the ultrafiltration in diafiltration mode to reduce the lactose content of protein concentrates," Tecnico Lisboa, 2015, Semantic Scholar, https://fenix.tecnico.ulisboa.pt/downloadFile/1126295043834971/Extended%20Abstract%20SofiaCabral65786.pdf.

R. Paulen, "Minimizing the process time for ultrafiltration/diafiltration under gel polarization conditions," Journal of Membrane Science, Sep. 2018, vol. 380, Issue: 1-2, pp. 148-154, Science Direct, https://www.researchgate.net/publication/230554948_Minimizing_the_process_time_for_ultrafiltrationdiafiltration_under_gel_polarization_conditions/link/5a995b1ba6fdcc3cbac8f921/download.

Maximilian Johannes Huter et al., "Model Validation and Process Design of Continuous Single Pass Tangential Flow Filtration Focusing on Continuous Bioprocessing for High Protein Concentrations," Processes, 2019, vol. 7(11), MDPI, https://www.mdpi.com/2227-9717/7/11/781.

* cited by examiner

METHOD AND SYSTEM TO MONITOR AND CONTROL CONTINUOUS ULTRAFILTRATION PROCESS UNITS

CROSS-REFERENCE TO RELATED APPLICATIONS AND PRIORITY

This U.S. patent application claims priority under 35 U.S.C. § 119 to: Indian Patent Application No. 202121050333, filed on Nov. 2, 2021. The entire contents of the aforementioned application are incorporated herein by reference.

TECHNICAL FIELD

The disclosure herein generally relates to ultrafiltration, and, more particularly, to method and system to monitor and control continuous ultrafiltration process units.

BACKGROUND

Recovery of high-quality valuable end products is a very important industrial process. Membrane ultrafiltration (UF) is a pressure-modified, convective process that uses semi-permeable membranes to separate species in aqueous solutions by molecular size, shape, and/or charge. It separates solvents from solutes (i.e., the dissolved species) of various sizes. The result of removing solvent from a solution is solute concentration or enrichment. Integration of sensors, process equipment and control strategies are essentially required to achieve robust continuous UF operations to maintain a consistent product concentration output. In real time, continuous operation of UF to handle variating concentration in feed stream is tedious and complex. In a continuous biopharma manufacturing, monoclonal antibodies (mAbs) are an important product that are concentrated through UF. Process analytical tools (PAT) approach for monitoring and control of mAbs concentration in continuous UF are limited in nature and insufficient to handle potential challenges. Optimization of UF module configuration to handle the requirements of continuous process is significantly expensive in the downstream process.

SUMMARY

Embodiments of the present disclosure present technological improvements as solutions to one or more of the above-mentioned technical problems recognized by the inventors in conventional systems. For example, in one embodiment, a method and system to monitor and control continuous ultrafiltration process units is provided. The system includes receiving by a data receiving module, a plurality of input data from one or more sensors configured to an UF process units, wherein the plurality of input data comprises a real time data and a non-real time data. Further, the real time data is preprocessed by removing outliers and imputing missing values. The conductivity data conversion (CDC) module converts an inline conductivity sensor data associated with the real time data into a concentration of protein of interest at (i) a feed flow stream, and (ii) a retentate stream of the UF process units based on a plurality of CDC models. Then, using a prediction module predicts a volumetric concentration factor (VCF) value and a throughput value of the UF process units by selecting a model from a model repository using the real time data and the non-real time data comprising (i) a pressure data, (ii) a feed flow rate and (iii) the concentration of protein of interest in the feed flow stream. Further, an optimization module optimizes the VCF value, and the throughput value based on a plurality of optimal variables recommended for a given feed concentration, wherein the plurality of optimal variables comprises an optimal feed flow rate and an optimal pressure data. The control module controls the VCF value and the throughput value for a predefined period of a prediction horizon based on a plurality of trajectory profiles recommended for the feed flow rate, the pressure data, and a feed concentration. Further, the control module controls the VCF value and the throughput by estimating, the plurality of trajectory profiles for the VCF value and the throughput value with its corresponding trajectories of the feed flow rate and the pressure data. Further, the plurality of trajectory profiles is recommended for the feed flow rate and the pressure data.

In another aspect, a method for monitor and control continuous ultrafiltration process units is provided. The method includes receiving by a data receiving module, a plurality of input data from one or more sensors configured to an UF process units, wherein the plurality of input data comprises a real time data and a non-real time data. Further, the real time data is preprocessed by removing outliers and imputing missing values. The conductivity data conversion (CDC) module converts an inline conductivity sensor data associated with the real time data into a concentration of protein of interest at (i) a feed flow stream, and (ii) a retentate stream of the UF process units based on a plurality of CDC models. Then, using a prediction module predicts a volumetric concentration factor (VCF) value and a throughput value of the UF process units by selecting a model from a model repository using the real time data and the non-real time data comprising (i) a pressure data, (ii) a feed flow rate and (iii) the concentration of protein of interest in the feed flow stream. Further, an optimization module optimizes the VCF value, and the throughput value based on a plurality of optimal variables recommended for a given feed concentration, wherein the plurality of optimal variables comprises an optimal feed flow rate and an optimal pressure data. The control module controls the VCF value and the throughput value for a predefined period of a prediction horizon based on a plurality of trajectory profiles recommended for the feed flow rate, the pressure data, and a feed concentration. Further, the control module controls the VCF value and the throughput by estimating, the plurality of trajectory profiles for the VCF value and the throughput value with its corresponding trajectories of the feed flow rate and the pressure data. Further, the plurality of trajectory profiles is recommended for the feed flow rate and the pressure data.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to receive by a data receiving module, a plurality of input data from one or more sensors configured to an UF process units, wherein the plurality of input data comprises a real time data and a non-real time data. Further, the real time data is preprocessed by removing outliers and imputing missing values. The conductivity data conversion (CDC) module converts an inline conductivity sensor data associated with the real time data into a concentration of protein of interest at (i) a feed flow stream, and (ii) a retentate stream of the UF process units based on a plurality of CDC models. Then, using a prediction module predicts a volumetric concentration factor (VCF) value and a throughput value of the UF process units by selecting a model from a model repository using the real time data and the non-real time data comprising (i) a pressure data, (ii) a feed flow rate and (iii) the concentration of protein of interest in the feed flow stream. Further, an optimization module optimizes the VCF value, and the throughput value based on a plurality of optimal variables recommended for a given feed concentration, wherein the plurality of optimal variables comprises an optimal feed flow rate and an optimal pressure data. The control module controls the VCF value and the throughput value for a predefined period of a prediction horizon based on a plurality of trajectory profiles recommended for the feed flow rate, the pressure data, and a feed concentration. Further, the control module controls the VCF value and the throughput by estimating, the plurality of trajectory profiles for the VCF value and the throughput value with its corresponding trajectories of the feed flow rate and the pressure data. Further, the plurality of trajectory profiles is recommended for the feed flow rate and the pressure data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
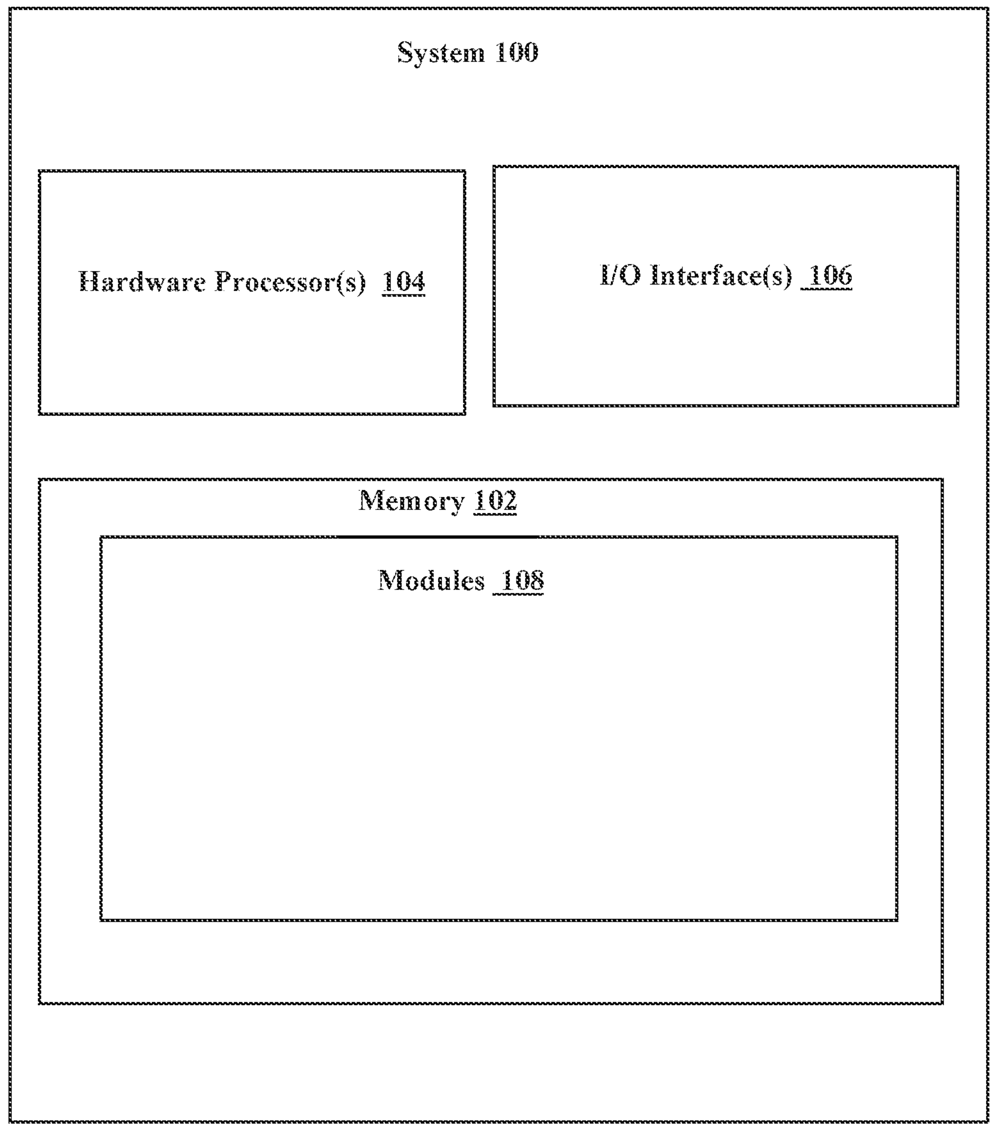
FIG. 1 illustrates an exemplary system for monitoring and controlling continuous ultrafiltration process units, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Embodiments herein provide a method and system to monitor and control continuous ultrafiltration process units. The system can be alternatively referred as UF plant system 100. The said UF plant system 100 is enabled for controlling the feed flowrate for a target volumetric concentration factor (VCF). The system is also enabled for optimizing the feed flowrate for maximizing the target volumetric concentration factor (VCF) and throughput. The UF plant system 100 utilizes in-line concentration values obtained from conductivity measurements and experimental values from flow rate and pressure sensors to control the optimal feed flowrate by performing dynamic optimization. It provides optimal trajectories rather than giving mere identification of optimal conditions. The UF plant system 100 comprises of a plurality of components integrated with one or more sensors equipped with control strategies for robust ultrafiltration (UF) operations. Importantly, a fouling index is considered as constraint for an optimization module 220 and a control module 222 of the UF plant system 100.

UF is an important process in continuous biopharma processing for concentrating various therapeutic agents. Monoclonal antibodies (mAbs) are one such class of therapeutic agent that are used in commercial drugs for treatment of rheumatoid arthritis, psoriasis, acute rejection of organ transplant, etc. Concentration of mAbs in the retentate stream decreases over time due to challenges such as concentration polarization, protein gel layer formation and irreversible membrane fouling. Such method derives reduced flux over time with reduced retentate concentration over time. Process scheduling of Ultrafiltration operations considering the batch and semi-batch operations in the upstream is also a challenge. For example, in continuous mAb process operations the feed to UF is the elute stream from a continuous multi-column chromatography (MCC). Although the input to MCC is continuous, the elution of different components is periodic in nature (not continuous). Therefore, an intermediate surge tank is used to make sure that the UF does not run dry. It further reduces the concentration gradient in feed to the UF. Also, a periodic cleaning of membrane is important for a prolonged membrane life. Therefore, considering these conditions, scheduling, optimization and control of UF is challenging in nature. However, the disclosed system provides continuous monitoring and control of ultrafiltration with an agnostic approach as described in conjunction with FIG. 1 through FIG. 8 below.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates an exemplary system for monitoring and controlling continuous ultrafiltration process units, in accordance with some embodiments of the present disclosure. In an embodiment, the UF plant system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the UF plant system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
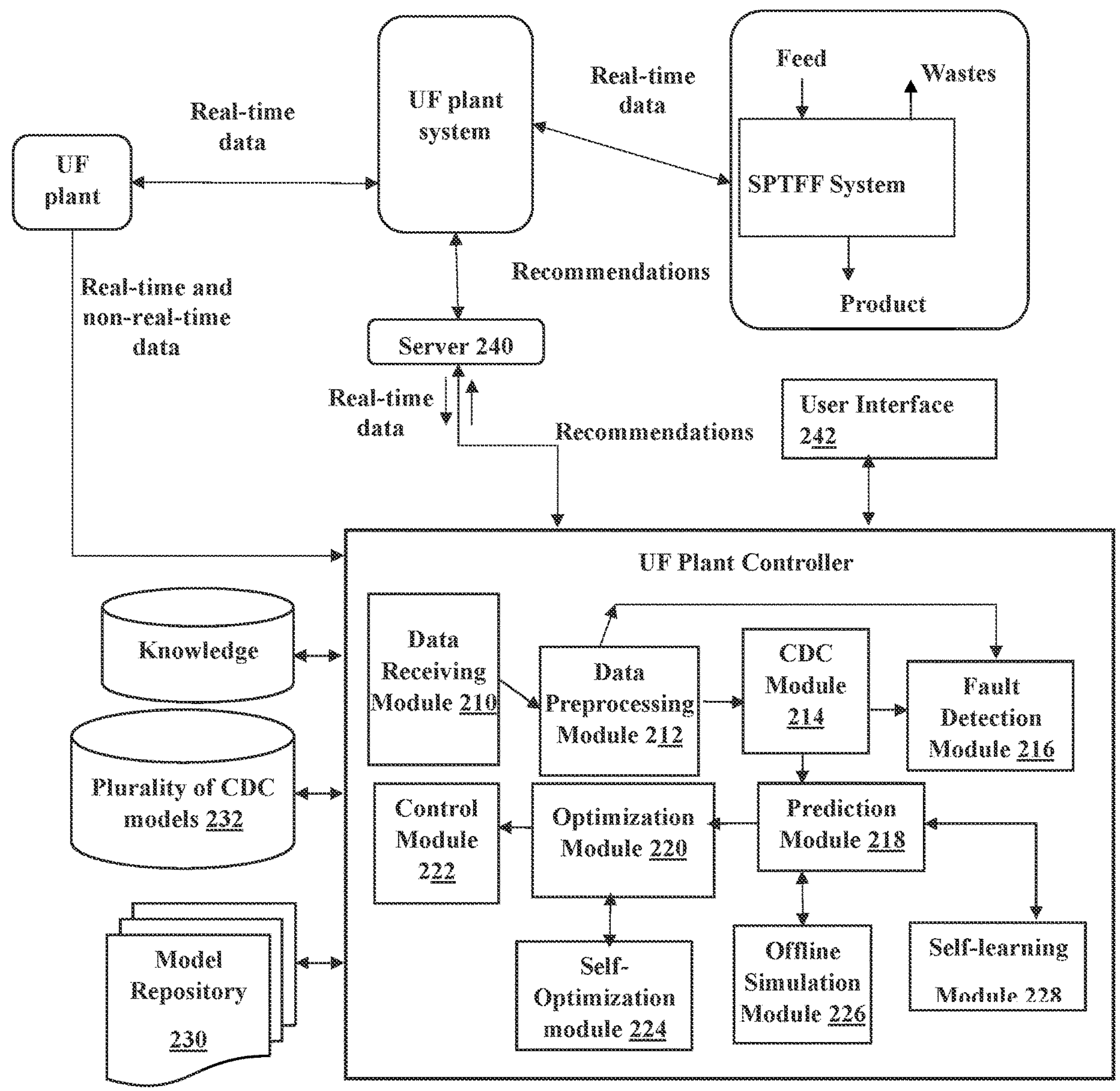
FIG. 2 illustrates an exemplary high level block diagram of the ultrafiltration process units using the system of FIG. 1, in accordance with some embodiments of the present disclosure.

FIG. 2 illustrates an exemplary high level block diagram of the ultrafiltration process units, in accordance with some embodiments of the present disclosure. FIG. 2 includes a UF data sources 236, a UF controller, a knowledge database 234, a server 240, a plurality of conductivity data conversion (CDC) models 232, and a model repository 230. The UF data sources component 236 is connected in series with the UF plant system, wherein the UF data sources 236 receives a real time data and a non-real time data from the UF plant system 100. The server 240 of the system 100 transfers data to the other modules associated with the UF plant system 100 via the user interface 242. The UF plant controller comprises a data receiving module 210, a data preprocessing module 212, a conductivity data conversion (CDC) module 214, a fault detection module 216, a control module 222, an optimization module 220, a prediction module 218, a self-optimization module 224, an offline simulation module 226, and a self-learning module 228.

The data receiving module 216 of the UF plant system 100 is configured to receive a real-time data from the server and a non-real-time data from the data sources at a predetermined frequency as a plurality of input data. The real time data includes a transmembrane pressure data, an inline conductivity sensor data, a feed flow rate, and a tank level data. The non-real time data includes an experimental measured value of concentration of protein of interest for the feed stream and the retentate stream.

The data preprocessing module 212 of the UF plant system 100 is configured to pre-process the received real time data by removing outliers and then imputing missing values. The real time data is further preprocessed for identifying and removing outliers obtained from the one or more sensors. Further, missing data is imputed from the removed outliers by synchronizing and integrating a plurality of variables from one or more data sources using the predetermined frequency. Referring now to an example, where the UF plant system 100 processes the plurality of input data to control feed flow rate. Noise from the real time data may contain outliers and anomalies. In some cases, malfunctioning sensors may provide impractical values too. These measurements require pre-processing to utilize them for practical utilization such as soft-sensor predictions and thereof. The real time data is pre-processed for identification and removal of outliers, imputation of missing data and synchronization and integration of data from various sensors (a dynamic stability (DSC) sensor, a laser measurement (LMS) sensor, a oxidation reduction potential (ORP) sensor and the like) with their corresponding frequency. The complexity in frequency of measurement and integration of data from the one or more sensors with different measurement frequencies is an additional challenge that needs to be considered during data pre-processing. The sampling frequency of the real-time and the non-real-time data may be unified too, for example, once every 1 min, where the real-time data is averaged as necessary, and the non-real-time data is interpolated or replicated as necessary.

The conductivity data conversion module 214 of the UF plant system 100 converts the inline conductivity measurements to concentration values based on a plurality of CDC models.

The prediction module 218 of the UF plant system 100 is configured to use the selected model from a model repository for the prediction of critical quality parameters (CQP) such as VCF and throughput. Volumetric Concentration Factor (VCF) is the ratio of the initial volume to the final volume of retentate during the ultrafiltration process units. The mechanistic model considers gel-polarization model for predicting the ultrafiltration flux. The gel polarization model of protein ultrafiltration assumes that a layer of protein of constant concentration is deposited at the membrane surface. The ultrafiltration flux is therefore controlled by three hydraulic resistances in series, namely the membrane resistance $R_m$, the deposited layer resistance $R_d$, and the boundary layer resistance $R_b$. The osmotic pressure is assumed to be ≈0. The filtrate flux J is then given by the following equation 1 as per Darcy's Law for fluid flow across a membrane with cylindrical pores as described below in equation 1, $$J = \frac{\Delta P}{\eta(R_m + R_d + R_b)} \quad \text{equation 1}$$

The intrinsic membrane resistance $R_m$ can be calculated from the pure water flux $J_w$ s described below in equation 2, $$R_m = \frac{\Delta P}{\eta J_w} \quad \text{equation 2}$$

Since, the deposited layer is assumed to have uniform concentration, it can be characterized with a mean specific resistance $\alpha_d$ and expressed as the product with the mass of deposited solute per unit area of membrane $M_d$. The kinetic process of protein deposition is captured by the rate of deposition $M_d(t)$ as described in equation 3, $$R_d = \alpha_d M_d(t) \quad \text{equation 3}$$

The deposition kinetics are modelled using the assumption that the rate of deposition was governed by a deposition potential, and that the total deposition approaches a maximum plateau $M_d^*$ with rate constant K as described below in equation 4 and equation 5, $$\frac{dM_d}{dt} = K(M_d^* - M_d) \quad \text{equation 4}$$

$$M_d = M_d^*(1 - e^{-Kt}) \quad \text{equation 5}$$

The resistance of the boundary layer is expressed using the initial ultrafiltration flux Ji which is the flux after concentration polarization but before substantial deposition as described in equation 6, $$R_b = \frac{\Delta P}{\eta J_i} - R_m \quad \text{equation 6}$$

Combining equations (2), (4) and (5) with the equation (1) yields the following expression for the filtrate flux profile of a single membrane as described in equation 7, $$J(t) = \frac{\Delta P}{\eta\left(R_m + \alpha_d M_d^*\left(1 - e^{-Kt}\right) + R_b\right)} \quad \text{equation 7}$$

For a given feed flowrate U, membrane area A, and the flux J, estimated from the equation 7, VCF is calculated using the equation 8, $$VCF = \frac{C_{out}}{C_{in}} = \frac{U_{in}}{(U_{in} - A \times J)} \quad \text{equation 8}$$

The optimization module 220 of the UF plant system 100 is configured to optimize a plurality of operating parameters of the UF process units using a plurality of models from the model repository. The plurality of operating parameters includes an transmembrane pressure, a feed flowrate and a time at which pumps are triggered. The plurality of operating parameters is optimized to either maximize or minimize or maintain critical quality parameters (CQP) or key performance indicators (KPIs) at a target value. The CQPs or KPIs of UF process units comprises the VCF, the throughput, the fouling index and the time of operation of the UF process.

The self-learning module 228 of the UF plant system 100 retrains the models in the model repository whenever the accuracy is compromised due to change in operating conditions or aging of the equipment or fouling in the membrane. Therefore, self-learning module makes sure that the models are accurate enough for monitoring and control.

The fault detection module 216 of the UF plant system 100 detects the anomalies and abnormalities in the UF process such as fouling of membranes, fault in pressure sensor, fault in flow-rate sensor, fault in conductivity sensor and so on. The fault detection module identifies fault based on one or more unforeseen changes observed in the values of different CQPs or KPIs and real time data from various sensors. For instance, for a similar value of operating variables, the deviation in the predicted VCF values from the expected VCF profile indicates irreversible membrane fouling. Membrane fouling is the permanent clogging of pores due to deposition of various particles in the feed stream. The life of membrane depends upon the rate at which membrane fouling occurs. The membrane manufacturer can provide tentative information regarding the life of membrane and specify the number of passes after which the membrane can be replaced. However, the actual membrane fouling rate depend upon the operating conditions. The fault detection module 216 monitors the membrane fouling using various fault detection algorithms as Long Short-term Memory (LSTM) based encoder-decoder, etc. These algorithms estimate the fouling index using the CQP data. The fouling index ranges from 0 to 10, where 0 represents no fouling as in case of fresh membrane and 10 represents severe fouling such that the membrane is unable to concentrate the feed. The fouling index is, therefore, the indicator of the remaining useful life of the membrane. The fault detection module also provides the recommendations based on the detected fault.

The offline simulation module 226 of the UF plant system 100 is configured to perform simulation tasks on the UF process that are, in general, not required or not possible in real time regular intervals. It further consists of configuration design module. The configuration design module can be used to design the optimized configuration (consisting of multiple smaller membranes in series and parallel) for the UF module, to achieve the required concentration factor under the required operating conditions while minimizing the total membrane surface area in order to minimize consumable costs for the UF step.

The self-optimization module 224 of the UF plant system 100 receives the optimized operating variables from the optimization module 220, the received profiles of operating variables are compared with the data of operating variable profile available in the knowledge data base. If the recommended profiles of operating variables are deviating from the expected profiles beyond a predefined threshold value, the self-optimization module 224 is triggered.

Figure 3:
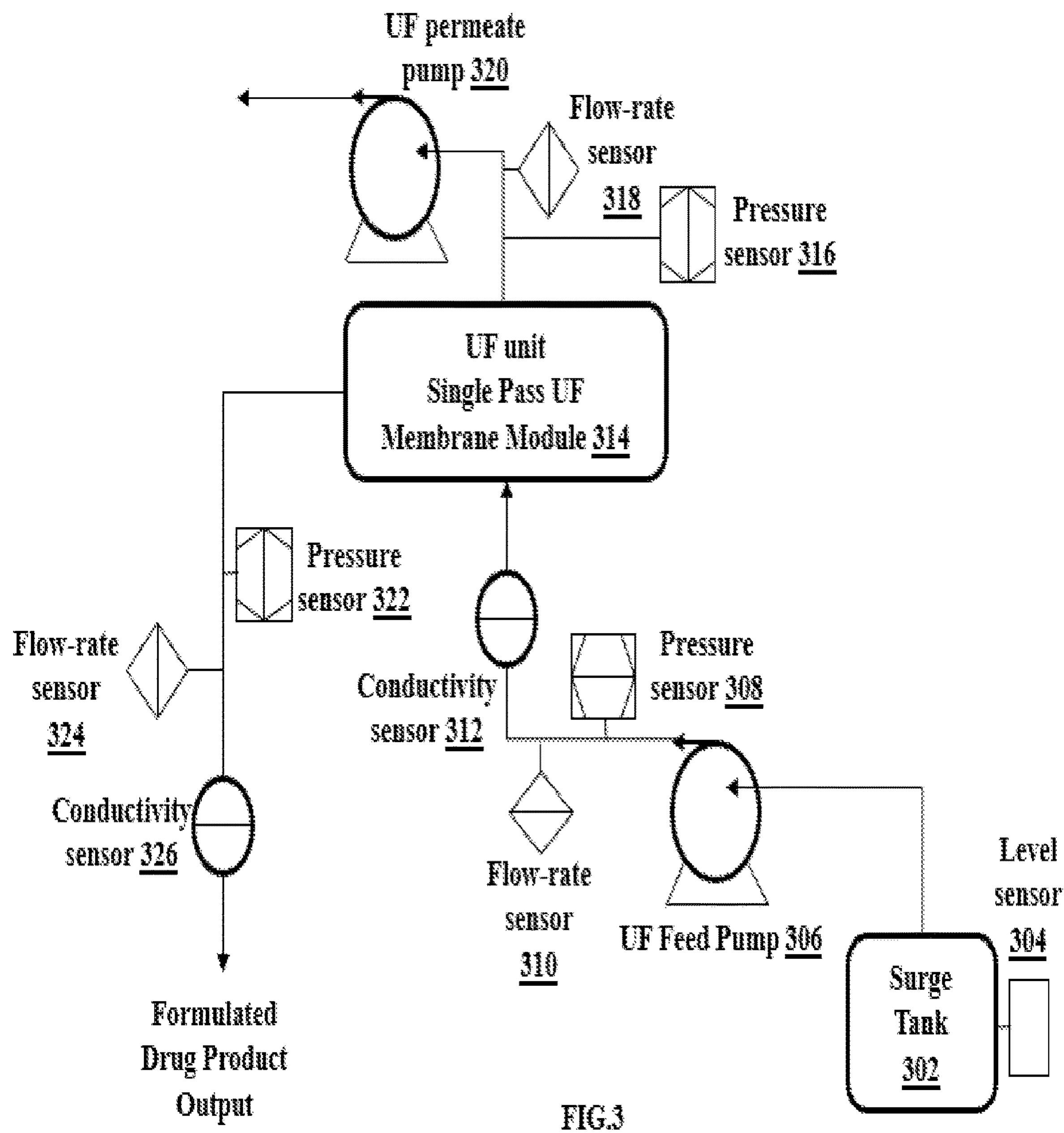
FIG. 3 illustrates an exemplary detailed block diagram of the system for monitoring and controlling continuous ultrafiltration process units using the UF plant system 100 of FIG. 1, in accordance with some embodiments of the present disclosure FIG. 4A

FIG. 3 illustrates an exemplary detailed block diagram of the system for monitoring and controlling continuous ultrafiltration process units, in accordance with some embodiments of the present disclosure. The unit consists of a surge tank 302 that collects the feed from upstream processes and supplies to the UF process units when needed. The surge tank 302 has a level sensor 304 to measure the level of feed in the surge tank. The UF feed pump 306 supplies feed from the surge tank 302 to the UF unit. A pressure sensor 308, a flow-rate sensor 310 and a conductivity sensor 312 measures the pressure, the flow rate, and the concentration of the feed stream before it enters the UF unit. The UF unit consist of a single pass ultrafiltration membrane module 314. The feed stream passes through this membrane modules and get divided into two streams such as a retentate stream (that has high concentration of the product of interest) and a permeate stream that has been filtered out. The retentate stream can thus be referred as a product stream. The pressure sensor 322, a flow-rate senor 324 and an in-line conductivity sensor 326 measures the pressure, flow rate and concentration of the retentate or product stream. A permeate pump 320 extracts the permeate out from the UF process unit. The pressure sensor 316 and the flow rate sensor 318 is used to measure the pressure and the flow rate of the permeate stream used in calculating the permeate flux.

Figure 4A:
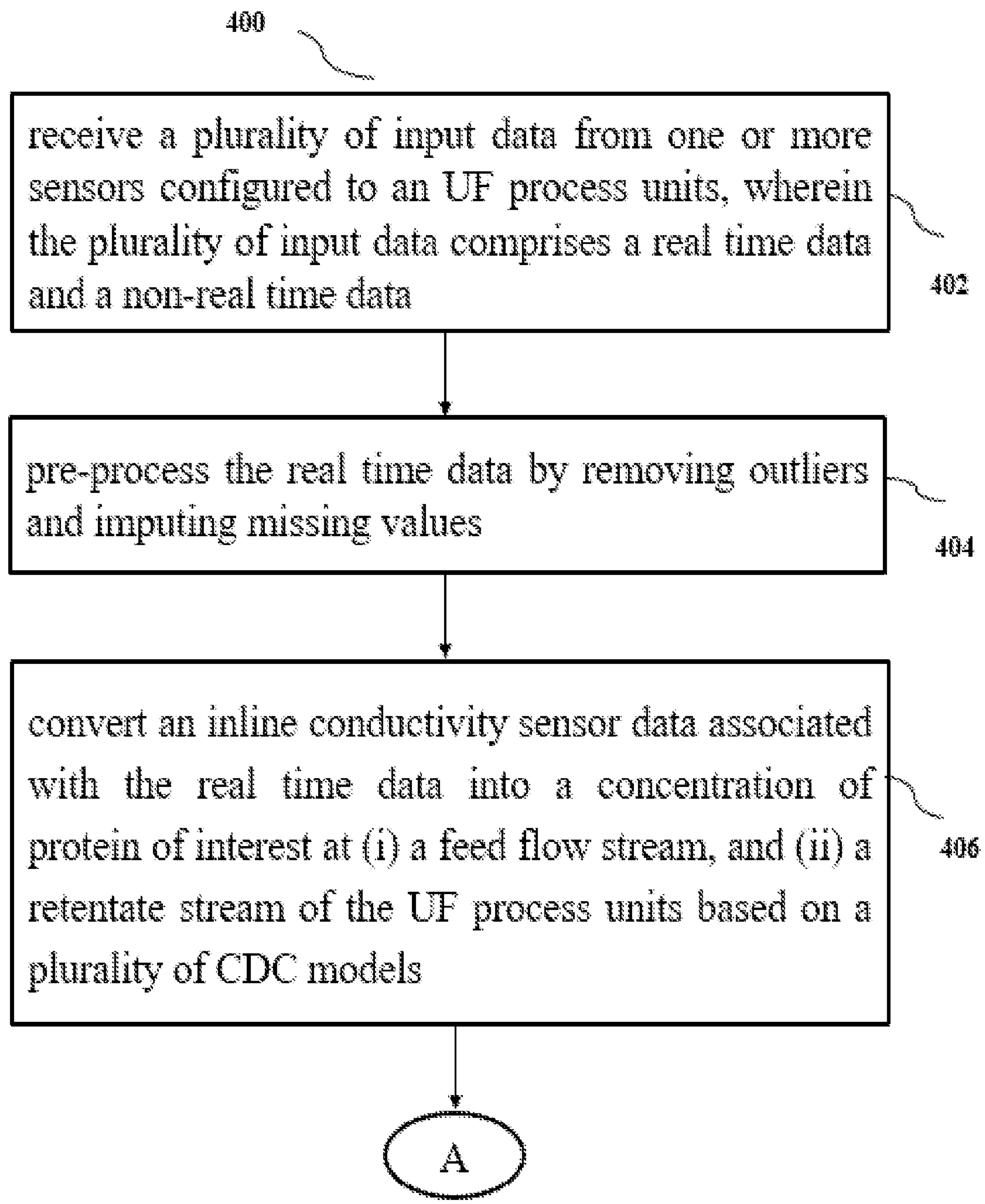
FIG. 4B illustrates an exemplary flow chart illustrating a method for monitoring and controlling continuous ultrafiltration process units using the UF plant system 100 of FIG. 1, in accordance with some embodiments of the present disclosure.
Figure 4B:
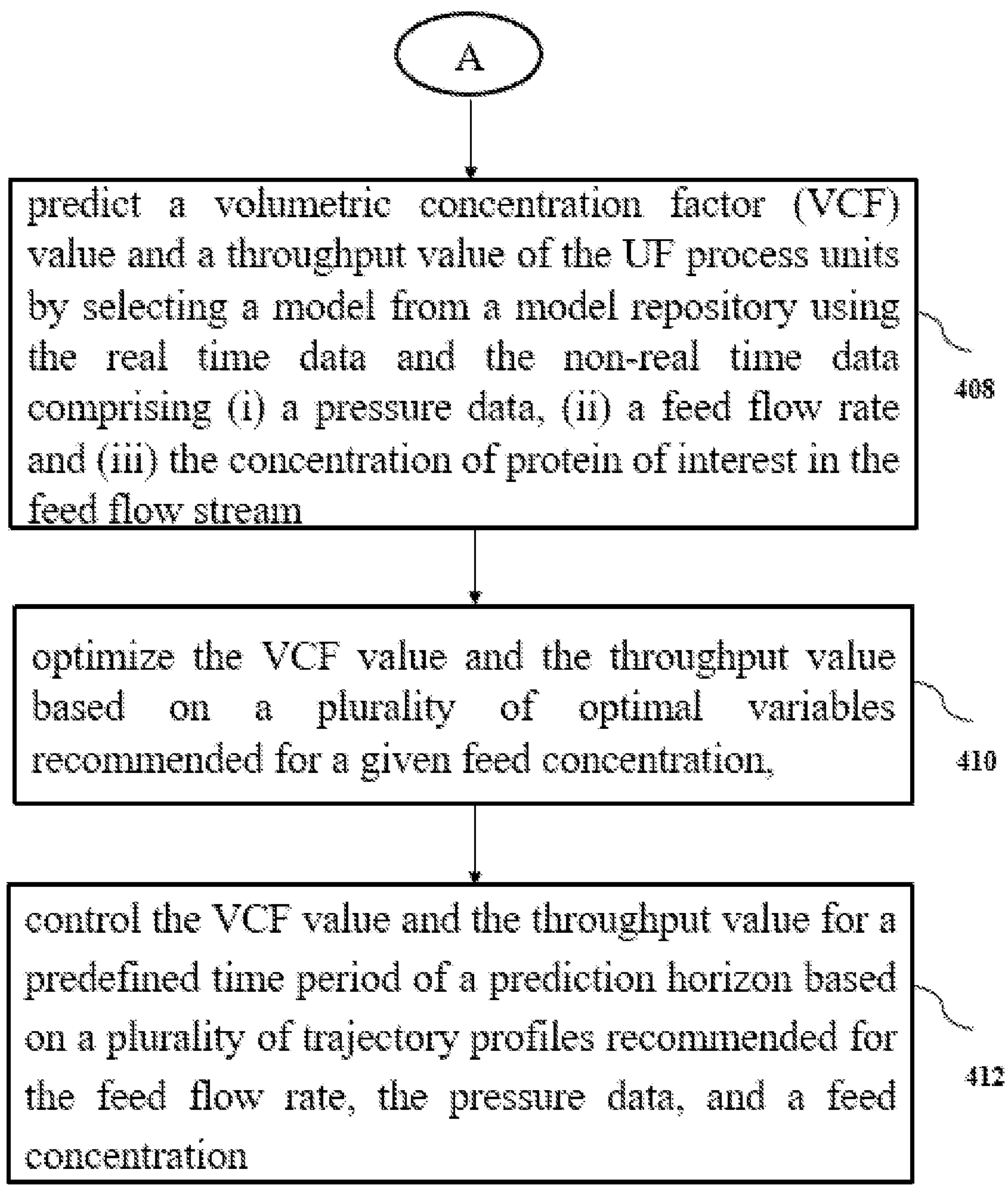

FIG. 4A and FIG. 4B illustrates an exemplary flow chart illustrating a method for monitoring and controlling continuous ultrafiltration process units, using the system of FIG. 1, in accordance with some embodiments of the present disclosure. In an embodiment, the UF plant system 100 comprises one or more data storage devices or the memory 102 operatively coupled to the processor(s) 104 and is configured to store instructions for execution of steps of the method 400 by the processor(s) or one or more hardware processors 104. The steps of the method 400 of the present disclosure will now be explained with reference to the components or blocks of the system 100 as depicted in FIG. 2 through FIG. 8 and the steps of flow diagram as depicted in FIG. 4A and FIG. 4B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 400, at step 402, the one or more hardware processors 104 receive via a data receiving module, a plurality of input data from one or more sensors configured to an UF process units, wherein the plurality of input data comprises a real time data and a non-real time data. Referring to the above said example, where the UF plant system 100 processes the received plurality of input data to control feed flow rate.

At step 404, of the method 400, the one or more hardware processors 104 preprocess the real time data by removing outliers and imputing missing values. Here, the real time data of the above referred example is preprocessed for identifying and removing outliers obtained from one or more sensors. Further, missing data is imputed from the removed outliers by synchronizing and integrating a plurality of variables from one or more data sources using a predetermined frequency.

At step 406, of the method 400, the one or more hardware processors 104 convert via a conductivity data conversion (CDC) module, an inline conductivity sensor data associated with the real time data into a concentration of protein of interest at (i) a feed flow stream, and (ii) a retentate stream of the UF process units based on a plurality of CDC models. From the above example, the CDC module 214 converts the inline conductivity sensor data obtained from the real time data into the concentration of protein of interest.

Referring now to the steps of the method 400, at step 408, the one or more hardware processors 104 predict using a prediction module, a volumetric concentration factor (VCF) value and a throughput value of the UF process units by selecting a model from a model repository using the real time data and the non-real time data comprising (i) a pressure data, (ii) a feed flow rate and (iii) the concentration of protein of interest in the feed flow stream. Further, the prediction module 218 is retuned using the self-learning module 228 predicts when a measured deviation between the experimental value of the VCF value and the determined VCF value exceeds a threshold of deviation.

Referring now to the steps of the method 400, at step 410, the one or more hardware processors 104 optimize using the optimization module, the VCF value and the throughput value (hereby referred as disturbance variable) based on a plurality of optimal variables recommended for a given feed concentration, wherein the plurality of optimal variables comprises an optimal feed flow rate and an optimal pressure data. The optimization module 220 (FIG. 3) performs real-time steady state optimization of the feed flow rate and pressure data (hereby referred as operating variables) while maximizing the VCF or maximizing the throughput or achieving the targeted VCF and throughput. The output of this optimization is the steady state set points of the operating variables that needs to be implemented for a required amount of time. The amount of time these set points needs to be implemented is further estimated control module 514 (FIG. 5) based on targeted VCF and optimal feed flow rate.

Referring now to the steps of the method 400, at step 412, the one or more hardware processors 104 control using a control module, via the one or more hardware processors, the VCF value and the throughput value for a predefined period of a prediction horizon based on a plurality of trajectory profiles recommended for the feed flow rate, the pressure data, and a feed concentration. Further, the VCF value and the throughput is controlled using the control module 514 by estimating the plurality of trajectory profiles for the VCF value and the throughput value with its corresponding trajectories of the feed flow rate and the pressure data. Further, the plurality of trajectory profiles is recommended for the feed flow rate and the pressure data.

Figure 5:
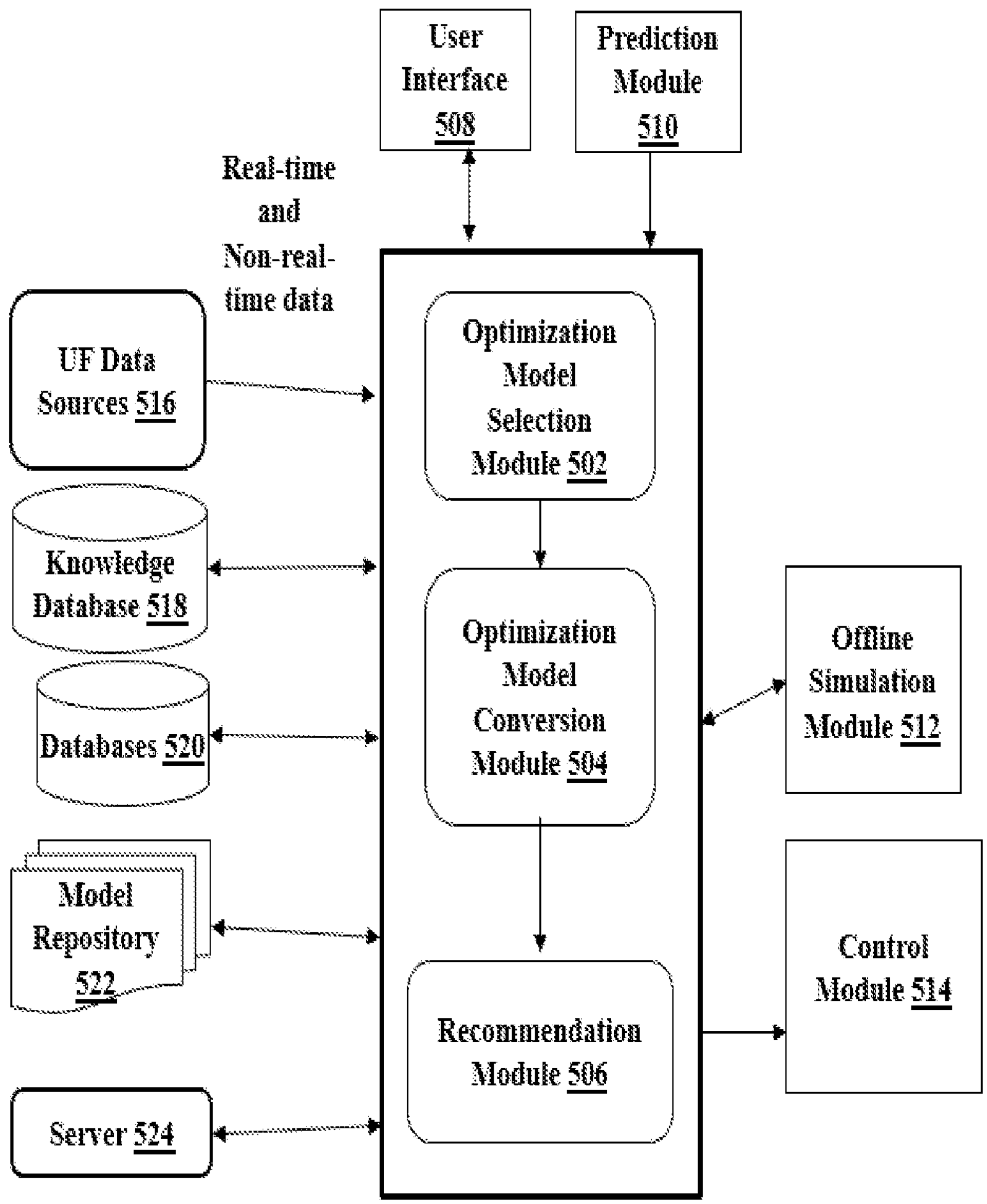
FIG. 5 illustrates an exemplary detailed block diagram of an optimization module 220 associated with the UF plant system 100 of FIG. 1, according to an embodiment of the present disclosure.

Referring now to FIG. 5, optimizing and controlling one or more of the pluralities of operating variables in the UF process units is performed using a control module 514, to improve the process by either maximizing the VCF or maximizing the throughput or achieving a targeted VCF or achieving a targeted throughput or minimizing the time of operation to achieve the given target of VCF and throughput or combination of any of these while considering the levels in the feed and product tanks of the process. The control module 222 (FIG. 2) performs dynamic optimization and estimates the trajectory of the operating variables for a time period of prediction horizon based on the observed changes in the disturbance variables and operating variables in the past and by forecasting the disturbance variables and predicting the operating variables for a time period of prediction horizon. Although the control module 222 recommends trajectory of optimum values of the operating variables for a time period of control horizon to the UF unit for better control and performance, all the changes are strictly in accordance with the constraints provided by the user. The control module 514 (FIG. 5) further perform real-time dynamic optimization for the next control horizon while the controller is implementing these actuation profiles. If pressure at any pump is more than the critical membrane pressure limit, then the pumps are switched off. At specific times, determined by the optimization module 220, buffer pumps are paused for manual cleaning and thereafter restarted. Therefore, determining the time at which buffer pump cleaning is initiated for the input.

In one embodiment the fault detection module 216 is used to detect one or more faults in the UF process units based on one or more expected profiles of CQP and sensor data. Each profile of the CQP and the sensor data is monitored based on the change observed in a plurality of operating variables from a pre-defined range of values. The root cause analysis is identified on the one or more detected faults in the UF process units. Further, one or more corrective actions are recommended based on fault detection using historical data, wherein the historical data comprises information on a corrective action taken for specific faults in past instances.

In one embodiment, the self-optimization module 224 tweaks the optimization models used in the optimization module 220 by retuning the optimization module, for the change observed on at least one of (i) the constraint values, (ii) tolerance or convergence criteria of an optimization algorithm. Further, an optimization algorithm is selected based on the retuned optimization module 220 by performing one or more of the following options such as 1. changing the objective function, 2. changing the values of the constraints, 3. changing the parameters such as tolerance or convergence criteria of optimization technique, and 4. choosing a different optimization technique.

FIG. 5 illustrates an exemplary detailed block diagram of an optimization module 220 associated with the system of FIG. 1, according to an embodiment of the present disclosure. The optimization module 220 referred in the FIG. 5 of the UF plant system 100 comprises an optimization model selection module 502, an optimization model conversion module 504 and a recommendation module 506 comprising an optimal critical parameter. The optimization model selection module 502 is configured to select and configure an optimization model specific to the UF plant system 100. The selection and configuration of an optimization model 502 is either performed at a predefined time interval, when the key performance indicators (KPIs) or CQPs of UF plant cross the predefined thresholds, or by manual intervention. The selection and configuration of the optimization model involves choosing and configuring various elements of optimization model such as type of optimization problem, direction of optimization, one or more KPIs or CQPs as objective functions, one or more KPIs or CQPs as constraints, lower or upper limits of constraints, one or more manipulated variables and their lower and upper limits. The type of optimization can be a single-objective or multi-objective optimization. The direction of optimization can be maximizing or minimizing the objective functions. The inputs of various elements of optimization model may be taken from the user via the user interface. These configured optimization models are further saved in model repository for further use. These pre-configured optimization models can be selected at a predefined time interval or by manual intervention by user. The optimization model conversion module 504 converts the selected KPIs or CQPs into objective functions and constraint functions by utilizing the selected KPIs or CQPs, type of optimization, direction of optimization and lower and upper limits on constraint functions.

The optimization model conversion module 504 converts the selected KPIs or CQPs into objective functions and constraint functions by utilizing the plurality of physics-based and data-driven models of the selected KPIs or CQPs, type of optimization, direction of optimization and lower and upper limits on constraint functions. The optimization model conversion module 504 is configured to save the converted optimization model to the model repository for further use. The optimization model conversion module 504 utilizes plurality of optimization solvers to generate one or more recommendations for the UF plant wherein recommendations comprise optimal settings for the manipulated variables configured in the optimization model. The optimization model comprise of solvers based on gradient descent, quasi newton methods and heuristic optimization approaches comprising Particle Swarm Optimization (PSO), genetic algorithms and bee colony optimization. Few examples optimization problem for the UF plant as shown below, Objective Function1: max(VCF)

Objective Function2: max(Throughput)

Constraints: $\text{Fouling}^L < \text{Fouling} < \text{Fouling}^U$

Figure 6:
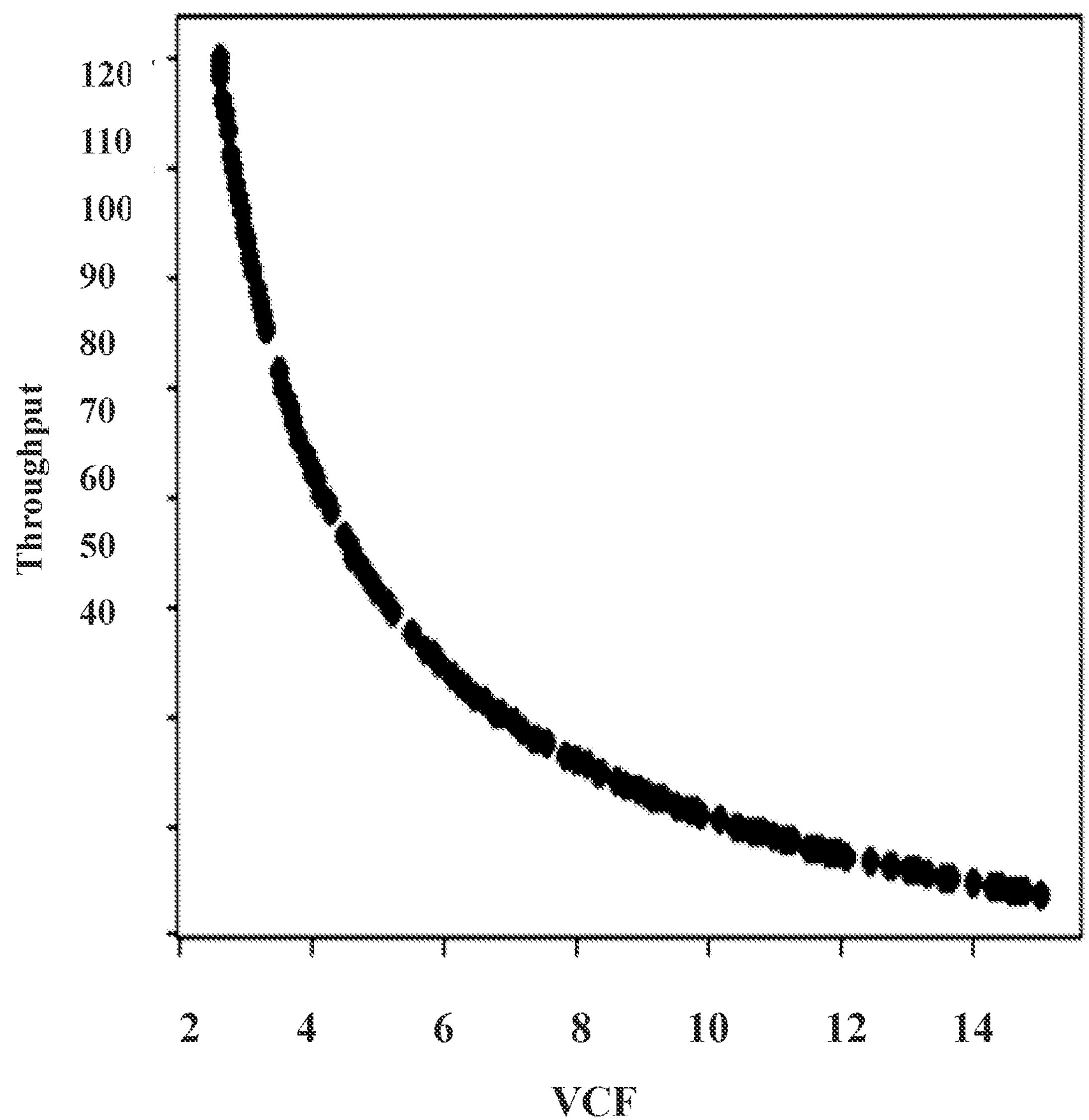
FIG. 6 shows an example graph representing optimized VCF value with the throughput value based on a plurality of optimal variables recommended for a given feed concentration using the UF plant system 100 of FIG. 1, according to an embodiment of the present disclosure.

Manipulated Variables: $\text{Flow rate}^L < \text{Flow rate} < \text{Flow rate}^U$ $\text{Transmembrane Pressure}^L < \text{Transmembrane Pressure} < \text{Transmembrane Pressure}^U$ The superscripts L and U refer to the lower and upper limits of the KPIs or CQPs and variables. The Pareto front in the FIG. 6 represents the set of all possible optimal solutions to the optimization model and from the FIG. 6, it can be observed that any of the recommendations from the Pareto front would result in higher VCF and higher throughput as shown below, Objective Function1: max(VCF)

Constraints: $\text{Fouling}^L < \text{Fouling} < \text{Fouling}^U$

Figure 7:
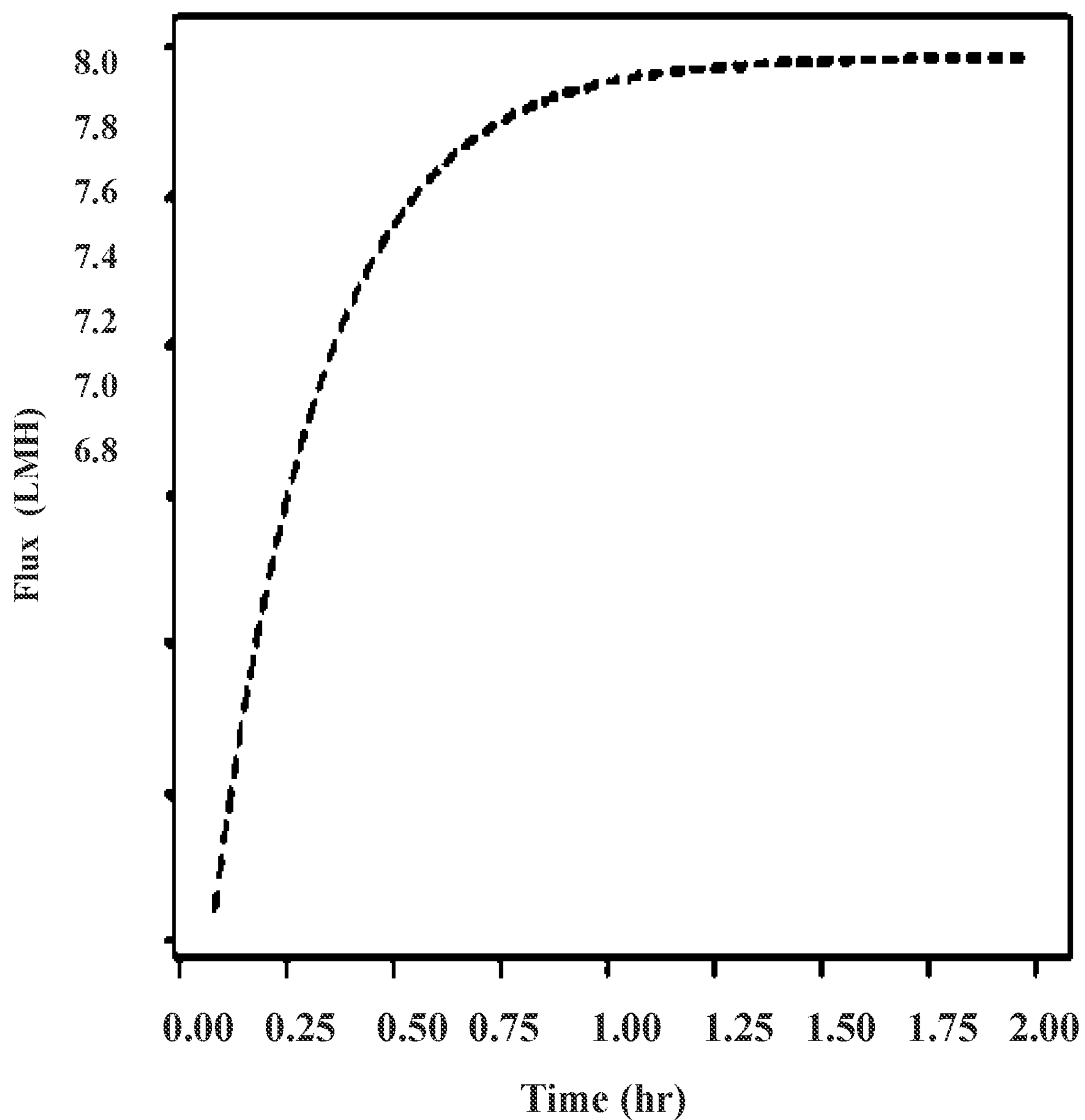
FIG. 7 shows an example graph representing the permeate flux corresponding to the optimal feed flow rate and transmembrane pressure as suggested by the optimization module 220 using the UF plant system 100 of FIG. 1, according to an embodiment of the present disclosure.

Manipulated Variables: $\text{Flow rate}^L < \text{Flow rate} < \text{Flow rate}^U$ $\text{Transmembrane Pressure}^L < \text{Transmembrane Pressure} < \text{Transmembrane Pressure}^U$ The superscripts L and U refer to the lower and upper limits of the KPIs or CQPs and variables. The optimal conditions as suggested by PSO for the above optimization problem are flowrate=20 ml/min and TMP=1.48 bar. Due to suggested lower feed flowrate, the permeate flux increases with time as shown in FIG. 7. However, due to lower feed flowrate, a lower throughput of 24 g is achieved. The recommendation module is configured to provide at least one recommendation generated using the configured optimizer to the UF plant system via the server and the user interface. The recommendations comprise of optimal settings of a plurality of manipulated variables. The generated recommendations are provided to optimize the key performance parameters of the UF plant system 100. The plurality of manipulated variables of the UF plant comprises feed flow rate and transmembrane pressure.

Figure 8:
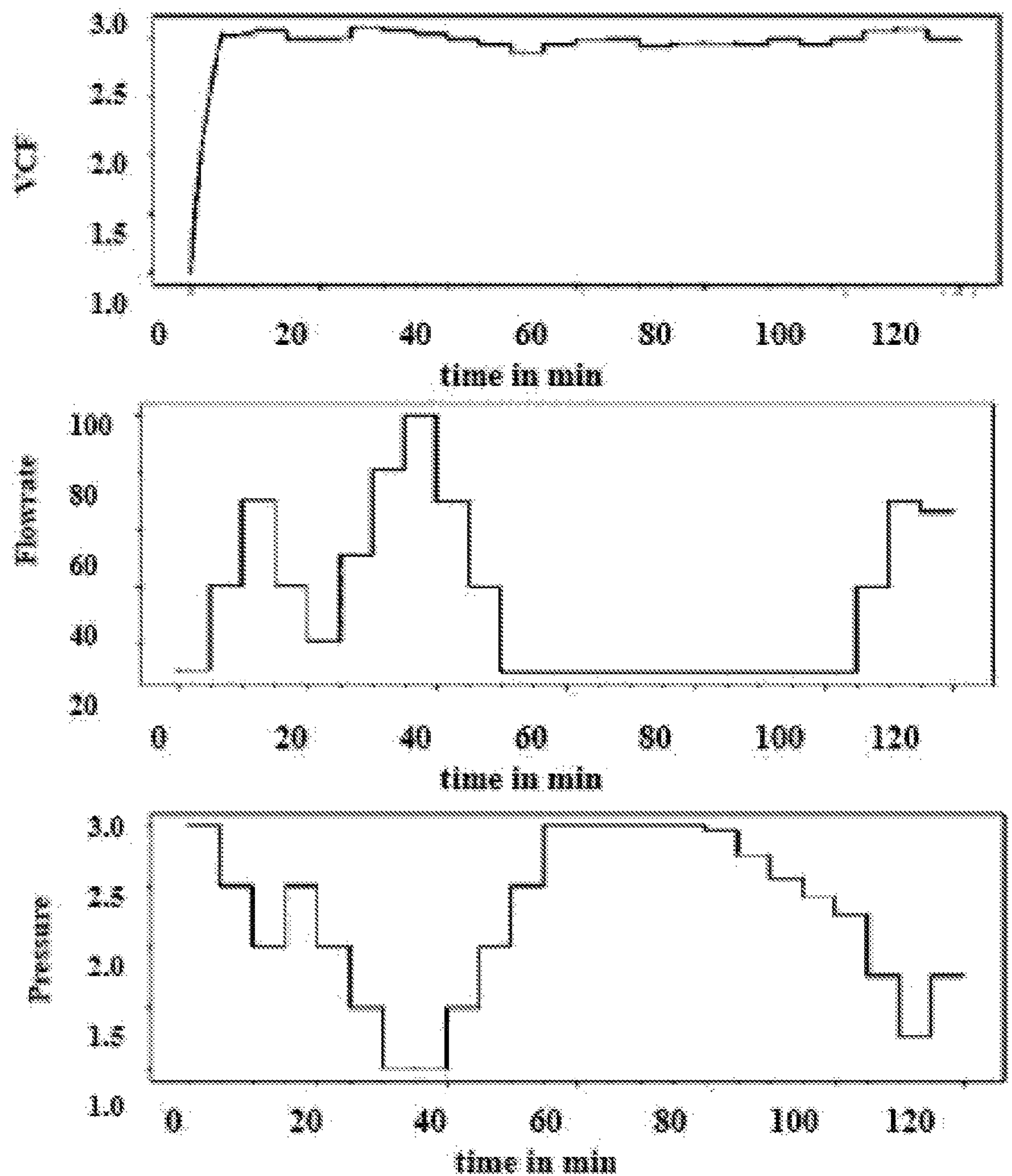
FIG. 8 illustrates an example graph represented for ultrafiltration (UF) process units, capturing the VCF being maintained at a target value and the corresponding trajectories of feed flowrate and the pressure values suggested by the control module using the UF plant system 100 of FIG. 1, according to an embodiment of the present disclosure.

The control module 514 monitors the critical process parameters (CPP) such as trans-membrane pressure and inline concentrations at feed, permeate and retentate streams. In one embodiment, the control module 514 performs dynamic optimization utilizing the physics based and data-based models of CQPs. The control module 514 further estimates the trajectory of the operating variables for a period of prediction horizon based on the observed changes in the disturbance variables and operating variables in the past. The control module 514 estimates these trajectories by forecasting the disturbance variables and estimating the operating variables for a period of prediction horizon through dynamic optimization. However, the control module recommends trajectory of optimum values of the operating variables for a time period of control horizon to the UF unit for better control and performance. All the changes are strictly in accordance with the constraints provided in the optimization module 220. The control module 514 further performs real-time dynamic optimization for the next control horizon while the controller is implementing these actuation profiles. The control module 514 further controls and turns off pumps when the pressure at any pump is more than the critical membrane pressure limit. The control module 514 further determines the time stamps at which pumps are turned on or turned off based on the optimal feed flowrate recommended by the optimization module 220. Few examples dynamic optimization problem for the UF plant as shown below, Objective Function1: $\min((VCF-3)^2)$ Constraints $Fouling^L < Fouling < Fouling^U$ $|(U_i-U_{i+1})|^L < |(U_i-U_{i+1})| < |(U_i-U_{i+1})|^U$ $|(P_i-P_{i+1})|^L < |(P_i-P_{i+1})| < |(P_i-P_{i+1})|^U$ Manipulated Variables $\text{Flow rate}^L < \text{Flow rate} < \text{Flow rate}^U$ $\text{Transmembrane Pressure}^L < \text{Transmembrane Pressure} < \text{Transmembrane Pressure}^U$ The superscripts L and U refer to the lower and upper limits of the KPIs or CQPs and variables. The VCF in the FIG. 8 represents VCF being maintained at the target value of 3× and the flow rate and transmembrane pressure represents the optimal trajectories to be maintained to control the VCF at 3× considering the disturbances in the feed concentration.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of handling the variability in the upstream feed in real time for a continuous ultrafiltration process. The embodiment thus provides a mechanistic model to adjust operating conditions to handle real time deviations in feed concentration and maintain target VCF. Moreover, the embodiments herein further provide a robust solution that handles long-term operation, unexpected process deviation and complex scheduling decisions. The UF plant system 100 utilizes in-line concentration values obtained from conductivity measurements and experimental values from flow rate and pressure sensors to control the optimal feed flowrate by performing dynamic optimization. Continuous operation of UF to handle variating concentration in feed stream is complex in real time. The UF plant system 100 processes the real time data by removing outliers and missing values are imputed. The fouling index is considered as constraint for an optimization module 220 and a control module of the UF plant system 100. The UF plant system 100 controls the VCF value and the throughput value for a predefined time period of a prediction horizon based on a plurality of trajectory profiles recommended for the feed flow rate, the pressure data, and a feed concentration.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for monitoring and controlling continuous ultrafiltration (UF) process units, the method further comprising:

receiving, via a one or more hardware processors, a plurality of input data from one or more sensors configured to an UF process units, wherein the plurality of input data comprises a real time data and a non-real time data;

pre-processing via the one or more hardware processors, the real time data by removing outliers and imputing missing values;

converting, via the one or more hardware processors, an inline conductivity sensor data associated with the real time data into a concentration of protein of interest at (i) a feed flow stream, and (ii) a retentate stream of the UF process units based on a plurality of CDC models;

predicting, via the one or more hardware processors, critical quality parameters (CQPs) comprises a volumetric concentration factor (VCF) value and a throughput value of the UF process units by selecting a model from a model repository using the real time data and the non-real time data further comprising (i) a pressure data, (ii) a feed flow rate and (iii) the concentration of protein of interest in the feed flow stream;

optimizing, via the one or more hardware processors, the VCF value and the throughput value based on a plurality of optimal variables recommended for a given feed concentration, wherein the plurality of optimal variables comprises an optimal feed flow rate and an optimal pressure data, wherein a plurality of operating parameters of the UF process units is optimized, using a plurality of models from the model repository, to maximize or minimize or maintain the CQPs or a key performance indicators (KPIs) at a target value, wherein the CQPs or the KPIs of the UF process units comprises the VCF, the throughput, a fouling index and a time of operation of the UF process units, wherein the fouling index is an indicator of a remaining useful life (RUL) of a membrane, wherein the fouling index ranges from 0 to 10, where 0 represents no fouling as in case of fresh membrane, and 10 represents severe fouling such that the membrane is unable to concentrate a feed;

controlling, via the one or more hardware processors, the VCF value and the throughput value for a predefined period of a prediction horizon based on a plurality of trajectory profiles recommended for the feed flow rate, the pressure data, and the feed concentration, retuning, via the one or more hardware processors, an optimization module using a self-optimization module, for a change observed on at least one of (i) constraint values, (ii) tolerance or convergence criteria of an optimization algorithm;

selecting, via the one or more hardware processors, an optimal optimization algorithm by performing (1) changing an objective function, (2) changing the constraints values, (3) changing parameters the tolerance or the convergence criteria of the optimization algorithm, and (4) choosing an another optimization algorithm;

recommending, via the one or more hardware processors, a trajectory of optimum values of a plurality of operating variables for a time period of a control horizon to the UF process units;

performing, via the one or more hardware processors, a real-time dynamic optimization for a subsequent control horizon while a UF controller in the UF process units is implementing actuation profiles, and further controls, turns off pumps in the UF process units, when a pressure at the pump is more than a critical membrane pressure limit; and determining, via the one or more hardware processors, time stamps at which the pumps in the UF process units are turned on or turned off based on recommended optimal feed flowrate.

2. The processor implemented method as claimed in claim 1, wherein the real time data includes a transmembrane pressure data, the inline conductivity sensor data, the feed flow rate, and a tank level data.

3. The processor implemented method as claimed in claim 1, wherein the non-real time data includes an experimental measured value of concentration of protein of interest for the feed stream and the retentate stream.

4. The processor implemented method as claimed in claim 1, wherein the fouling index is considered as a constraint for the optimization module and a control module.

5. The processor implemented method as claimed in claim 1, wherein the VCF value and the throughput are controlled by, estimate, the plurality of trajectory profiles for the VCF value and the throughput value with corresponding trajectories of the feed flow rate and the pressure data; and recommend, the plurality of trajectory profiles for the feed flow rate and the pressure data.

6. The processor implemented method as claimed in claim 1, wherein a prediction module is retuned by using a self-learning module, when a measured deviation between an experimental value of the VCF value and the determined VCF value exceeds a threshold of deviation.

7. The processor implemented method as claimed in claim 1, the one or more hardware processors are further configured by the instructions to:

detect, one or more faults in the UF process units based on the one or more expected profiles of VCF value by monitoring the VCF value associated with the plurality of operating variables for the change observed from a pre-defined range of values;

identify, the root cause analysis on the one or more detected faults in the UF process units;

recommend, one or more corrective actions based on a fault detection using historical data, wherein the historical data comprises information on a corrective action taken for specific faults in past instances; and recommend, the one or more corrective actions for the one or more faults detected.

8. A system for monitoring and controlling continuous ultrafiltration (UF) process units, further comprising:

a memory storing instructions;

one or more communication interfaces; and one or more hardware processors coupled to the memory via the one or more communication interfaces-, wherein the one or more hardware processors are configured by the instructions to:

receive, a plurality of input data from one or more sensors configured to an UF process units, wherein the plurality of input data comprises a real time data and a non-real time data;

pre-process, the real time data by removing outliers and imputing missing values;

convert, an inline conductivity sensor data associated with the real time data into a concentration of protein of interest at (i) a feed flow stream, and (ii) a retentate stream of the UF process units based on a plurality of CDC models;

predict, critical quality parameters (CQPs) comprises a volumetric concentration factor (VCF) value and a throughput value of the UF process units by selecting a model from a model repository using the real time data and the non-real time data further comprising (i) a pressure data, (ii) a feed flow rate and (iii) the concentration of protein of interest in the feed flow stream;

optimize, the VCF value and the throughput value based on a plurality of optimal variables recommended for a given feed concentration, wherein the plurality of optimal variables comprises an optimal feed flow rate and an optimal pressure data, wherein a plurality of operating parameters of the UF process units is optimized, using a plurality of models from the model repository, to maximize or minimize or maintain the CQPs or a key performance indicators (KPIs) at a target value, wherein the CQPs or the KPIs of the UF process units comprises the VCF, the throughput, a fouling index and a time of operation of the UF process units, wherein the fouling index is an indicator of a remaining useful life (RUL) of a membrane, wherein the fouling index ranges from 0 to 10, where 0 represents no fouling as in case of fresh membrane, and 10 represents severe fouling such that the membrane is unable to concentrate a feed;

control, the VCF value and the throughput value for a predefined period of a prediction horizon based on a plurality of trajectory profiles recommended for the feed flow rate, the pressure data, and the feed concentration, retune, an optimization module using a self-optimization module, for a change observed on at least one of (i) constraint values, (ii) tolerance or convergence criteria of an optimization algorithm;

select, an optimal optimization algorithm by performing (1) changing an objective function, (2) changing the constraints values, (3) changing parameters the tolerance or the convergence criteria of the optimization algorithm, and (4) choosing an another optimization algorithm;

recommend, a trajectory of optimum values of a plurality of operating variables for a time period of a control horizon to the UF process units;

perform, a real-time dynamic optimization for a subsequent control horizon while a UF controller in the UF process units is implementing actuation profiles and further controls, turns off pumps in the UF process units, when a pressure at the pump is more than a critical membrane pressure limit; and determine, time stamps at which the pumps in the UF process units are turned on or turned off based on recommended optimal feed flowrate.

9. The system of claim 8, wherein the real time data includes a transmembrane pressure data, the inline conductivity sensor data, the feed flow rate, and a tank level data.

10. The system of claim 8, wherein the non-real time data includes an experimental measured value of concentration of protein of interest for the feed stream and the retentate stream.

11. The system of claim 8, wherein the fouling index is considered as constraint for the optimization module and a control module.

12. The system of claim 8, wherein the VCF value and the throughput are controlled by, estimating, the plurality of trajectory profiles for the VCF value and the throughput value with corresponding trajectories of the feed flow rate and the pressure data; and recommending, the plurality of trajectory profiles for the feed flow rate and the pressure data.

13. The system of claim 8, wherein the prediction module is retuned using a self-learning module, when a measured deviation between an experimental value of the VCF value and the determined VCF value exceeds a threshold of deviation.

14. The system of claim 8, wherein the one or more hardware processors are further configured by the instructions to:

detect, one or more faults in the UF process units based on the one or more expected profiles of VCF value by monitoring the VCF value associated with the plurality of operating variables for the change observed from a pre-defined range of values;

identify, the root cause analysis on the one or more detected faults in the UF process units;

recommend, one or more corrective actions based on a fault detection using historical data, wherein the historical data comprises information on a corrective action taken for specific faults in past instances; and recommending, the one or more corrective actions for the one or more faults detected.

15. One or more non-transitory machine-readable information storage mediums comprising one or more instructions which when executed by one or more hardware processors cause:

receiving, a plurality of input data from one or more sensors configured to an UF process units, wherein the plurality of input data comprises a real time data and a non-real time data;

pre-processing, the real time data by removing outliers and imputing missing values;

converting, an inline conductivity sensor data associated with the real time data into a concentration of protein of interest at (i) a feed flow stream, and (ii) a retentate stream of the UF process units based on a plurality of CDC models;

predicting, critical quality parameters (CQPs) comprises a volumetric concentration factor (VCF) value and a throughput value of the UF process units by selecting a model from a model repository using the real time data and the non-real time data further comprising (i) a pressure data, (ii) a feed flow rate and (iii) the concentration of protein of interest in the feed flow stream;

optimizing, the VCF value and the throughput value based on a plurality of optimal variables recommended for a given feed concentration, wherein the plurality of optimal variables comprises an optimal feed flow rate and an optimal pressure data, wherein a plurality of operating parameters of the UF process units is optimized, using a plurality of models from the model repository, to maximize or minimize or maintain the CQPs or a key performance indicators (KPIs) at a target value, wherein the CQPs or the KPIs of the UF process units comprises the VCF, the throughput, a fouling index and a time of operation of the UF process units, wherein the fouling index is an indicator of a remaining useful life (RUL) of a membrane, wherein the fouling index ranges from 0 to 10, where 0 represents no fouling as in case of fresh membrane, and 10 represents severe fouling such that the membrane is unable to concentrate a feed;

controlling, the VCF value and the throughput value for a predefined period of a prediction horizon based on a plurality of trajectory profiles recommended for the feed flow rate, the pressure data, and the feed concentration, retuning, an optimization module using a self-optimization module, for a change observed on at least one of (i) constraint values, (ii) tolerance or convergence criteria of an optimization algorithm;

selecting, an optimal optimization algorithm by performing (1) changing an objective function, (2) changing the constraints values, (3) changing parameters the tolerance or the convergence criteria of the optimization algorithm, and (4) choosing an another optimization technique;

recommending, a trajectory of optimum values of a plurality of operating variables for a time period of a control horizon to the UF process units;

performing, a real-time dynamic optimization for a subsequent control horizon while a UF controller in the UF process units is implementing actuation profiles and further controls, turns off pumps in the UF process units, when a pressure at the pump is more than a critical membrane pressure limit; and determining, time stamps at which the pumps in the UF process units are turned on or turned off based on recommended optimal feed flowrate.

16. The one or more non-transitory machine-readable information storage mediums of claim 15, wherein the real time data includes a transmembrane pressure data, the inline conductivity sensor data, the feed flow rate, and a tank level data, wherein the non-real time data includes an experimental measured value of concentration of protein of interest for the feed stream and the retentate stream, wherein the fouling index is considered as constraint for the optimization module and a control module.

17. The one or more non-transitory machine-readable information storage mediums of claim 15, wherein the VCF value and the throughput are controlled by, estimate, the plurality of trajectory profiles for the VCF value and the throughput value with corresponding trajectories of the feed flow rate and the pressure data; and recommend, the plurality of trajectory profiles for the feed flow rate and the pressure data.

18. The one or more non-transitory machine-readable information storage mediums of claim 15, the one or more hardware processors are further configured by the instructions to:

detect, one or more faults in the UF process units based on the one or more expected profiles of VCF value by monitoring the VCF value associated with the plurality of operating variables for the change observed from a pre-defined range of values;

identify, the root cause analysis on the one or more detected faults in the UF process units;

recommend, one or more corrective actions based on a fault detection using historical data, wherein the historical data comprises information on a corrective action taken for specific faults in past instances; and recommend, the one or more corrective actions for the one or more faults detected.

* * * * *